US010318868B2

(12) United States Patent
Donatelli et al.

(10) Patent No.: US 10,318,868 B2
(45) Date of Patent: Jun. 11, 2019

(54) METHOD FOR ENHANCING A MIND MAP WITH DIFFERENT STREAMS OF INFORMATION

(71) Applicant: International Business Machines Corporation, Armonk, NY (US)

(72) Inventors: Alessandro Donatelli, Rome (IT); Rosario Gangemi, Rome (IT); Leonida Gianfagna, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 14/538,801

(22) Filed: Nov. 11, 2014

(65) Prior Publication Data

US 2015/0134573 A1  May 14, 2015

(30) Foreign Application Priority Data

Nov. 13, 2013 (GB) .................................. 1319980.7

(51) Int. Cl.
*G06N 5/02* (2006.01)

(52) U.S. Cl.
CPC ...................... *G06N 5/02* (2013.01)

(58) Field of Classification Search
None
See application file for complete search history.

(56) References Cited

U.S. PATENT DOCUMENTS

| 8,364,623 | B1 | 1/2013 | Bunker et al. |
| 8,380,716 | B2 | 2/2013 | Mirus |
| 2009/0119584 | A1 | 5/2009 | Herbst |
| 2011/0167329 | A1 | 7/2011 | Klaben |

OTHER PUBLICATIONS

Bota, et al., BAMS2 Workspace: A Comprehensive and Versatile Neuroinformatic Platform for Collating and Processing Neuroanatomical Connections, J Comp Neurol., 522(14), 2014, pp. 3160-3176.*
Bota, et al., BAMS2 Workspace: A Comprehensive and Versatile Neuroinformatic Platform for Collating and Processing Neuroanatomical Connections, J Comp Neurol., 522(14), 2014, pp. 3160-3176. (Year: 2014).*
"Text 2 Mind Map"; http://text2mindmap.com/; [retrieved Aug. 2014].
Foreman, Paul; "Mind Map Inspiration"; http://www.mindmapinspiration.com/how-to-convert-text-to-mind-map-paul-foreman/; Nov. 2012.

* cited by examiner

*Primary Examiner* — Wilbert L Starks
(74) *Attorney, Agent, or Firm* — Scully, Scott, Murphy & Presser, P.C.; Robert Shatto, Esq.

(57) ABSTRACT

Enhancement of a first mind map to become a second enhanced mind includes: providing a content pool with information items; performing a first semantic scan based on a selected object; and generating a new object and a related connection to the selected object based on the semantic scan. Furthermore, the enhancement includes determining a strength value for each of the connections of the first mind map and determining the connection with the lowest strength value and recalculating the strength value using an external knowledge base to define the connection as obsolete if the strength value decreases.

20 Claims, 4 Drawing Sheets

METHOD FOR ENHANCING A MIND MAP WITH DIFFERENT STREAMS OF INFORMATION

FIELD OF THE INVENTION

The invention relates generally to a method for enhancing a first mind map. The invention relates further to a mind map enhancement system, a computing system, a data processing program, and a computer program product.

BACKGROUND

Nowadays transformation is spread among different media like mail, Internet pages, chats that are accessed by different devices (desktops, local servers, smartphones, tablet computers). It may be difficult to organize this huge amount of information in a coherent stream and often times a long time is spent for searching links, important mails, documents and browser history on a specific topic. Moreover, the risk of losing something important is quite big.

On the other side, mind maps have proven to be a good tool to organize and visually outline information. A mind map is often created around a single word or text, placed in the center, to which associated ideas, words and concepts are added. Major categories radiate from a central node, and lesser categories are sub-branches of larger branches. Categories can represent words, ideas, tasks, or other items related to a central key word or idea. Mind maps may be drawn by hand, either as "rough notes" during a lecture or meeting, for example, or as higher quality pictures when more time is available. An example of a simple mind map is illustrated in FIG. 3. Mind maps are considered to be a type of spider diagram.

Mind maps may also be organized using computer assistance for visualizing and editing mind maps. Basically, an electronic form may work the same way as on paper. However, the objects being the nodes of the mind map as well as the connections between the different objects may be used to build a basis for a data structure of all elements of a computer-based mind map system which may be stored and re-edited at a later point in time or shared with among users.

Known are also methods for electronically augmenting mind map of a plurality of objects based on at least one data feed as disclosed by U.S. Pat. No. 8,380,716 B2. The method comprises providing an interface which contains visual representations of objects and associates semantic data with these objects. The interface allows for a user to access data from a data feed, and it analyzes these data in order to identify additional objects which may be semantically related to the object.

Also document U.S. Pat. No. 8,364,623 B1 discloses a related technology. The here disclosed method comprises receiving a request to generate a graphic summarization of relationships of a particular entity associated with an information technology infrastructure with other entities associated with the infrastructure, and generating a graphical representation of the particular entity and its relationships as a mind map comprising a plurality of linked nodes.

However, the associated mind maps are pretty static and require human interaction for enhancements.

The objective of this disclosure is to provide a method and a system to automatically organize heterogeneous information on a topic and provide a mind map that has a somewhat self-organizing character.

SUMMARY

This need may be addressed by a method for enhancing a first mind map, a mind map enhancement system, and a computer program product, according to the independent claims.

According to one aspect, a method for enhancing a first mind map may be provided. The method for enhancing a first mind map, in particular extending and qualifying a first mind map, may comprise objects and connections between the objects. The method may also comprise providing a data source comprising a local content pool comprising information items, performing a first semantic scan based on a selected object out of the objects using the content as input—in particular, by using a mind map unit and/or mind map enhancement system. A result of the first semantic scan may be generating a new object based on the first semantic scan, wherein the first semantic scan provides as output a semantic link between the selected object and the new object. Additionally, also a related connection between the selected object and the new object may be generated.

Moreover, the method may comprise determining a strength value for each of the connections of the first mind map based on the number of semantic links determined between each pair of connected objects of the first mind map based on a second semantic scan against each information item of the local content pool using each pair of connected objects as input. Thereby, the strength value may be determined by a formula for which the strength value increases with the number of semantic links value found in the connection. More particularly the formula may be:

strength value=$(OK\_Ref-KO\_Ref)/Ref$, wherein

OK_Ref=number of positive semantic links,
KO_Ref=number of negative semantic links, and
Ref=total number information items of the local content pool used for the second semantic scan.

Then, the connection with the lowest strength value—in particular—in the first mind map may be determined, in particular, by comparing and potentially sorting all connections. The object pair having the lowest strength value within the first mind map may then be used as input for a third semantic scan. Information items of an external knowledge base may be used for a recalculation of the strength value (new strength value) of the lowest strength value connection. The lowest strength value connection in the first mind map is obsolete if the new strength value is lower than the first calculated strength value. Thereby, the first mind map may be enhanced—in particular by extending the mind map with a new object and suppressing obsolete connections—building a second mind map.

System and computer program products corresponding to the above-summarized methods are also described and claimed herein.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
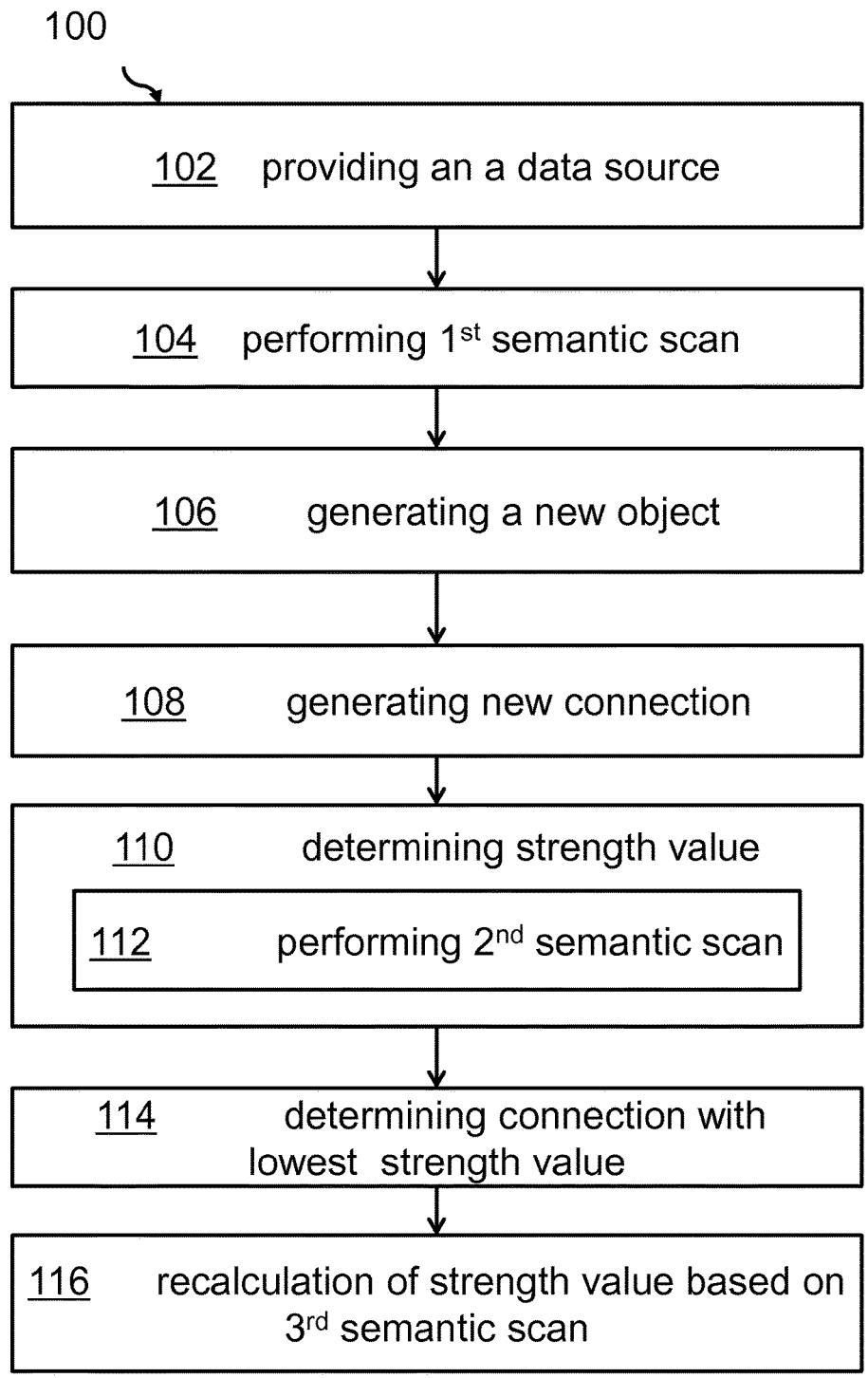
FIG. 1 shows a block diagram of an embodiment of the inventive method.

In the context of this description, the following conventions, terms and/or expressions may be used:

The term "first mind map" may denote an initially handcrafted mind map developed by a user. It may be used as a starting point for the method. The first mind map may comprise an initial expression defining a first object semantically linked to at least one additional object, said semantic link defining a connection between the first and one of the other objects.

The expression "object" may denote an expression with a semantically meaning like a word, an idea, a task, a concept, and the like. Everything that may have a meaning in the context of a user may be an object of a mind map.

The term "mind map" may denote a tool which may allow users to create visual representations of relationships between simple data structures, such as files, expressions, objects, concepts, or text segments, or anything else which may be expressed verbally and all graphically. The elements/objects of a mind map may be arranged intuitively according to the importance of the concepts and may be classified into groups, branches or, areas, with the goal of representing semantic or other relationships between portions of information represented as objects.

The term "connection" may denote a relationship between each two objects of a mind map. A connection is made of at least one semantic link between two objects. Semantic links between a pair of objects of a connection can be counted using a software semantic scanner. Typically, connections may be represented graphically as a line between objects. Objects may optionally be encircled.

The term "information item" may denote stored information units. It may be stored in a single file, a database entry, an entry in a content management system, a browser history, an e-mail, a chat history or parts thereof, and so on. Information items may be used as input for a semantic engine or semantic unit for a determination of a semantic link between two objects.

The term "semantic scan" may denote a process of searching for a semantic link between input expressions for the scan. An outcome of such a semantic scan may be "true" or "false" meaning "yes, there is a semantic link between the input expressions" or "no, there is no semantically link detectable between the input expressions". Such a semantic scan may be performed for one information item of a group of information items using two or more objects as input values. This may be a first mode of operation for a semantic engine. In an alternative mode, a semantic scan may be performed to find related expressions to a given object. In this case, only one expression or object—in particular, a selected object—may be input to the semantic scan process resulting in another "related expression" corresponding to a semantic link to one object being related to the selected object. The "Most related" objects may denote the connections having the highest number of semantic links within a given content pool.

The term "related expression" may denote an expression which may be related to an already existing object. The relationship may have been determined by a semantic scan.

The term "strength value" may denote an integer value, which may be normalized, for a connection between two objects. The strength value may be a result of a semantic scan of a content pool using the two objects as input values to be assessed.

The term "semantic link" may denote a semantic relationship between two objects.

The term "object pair" may denote two objects which may be directly linked by a connection.

The term "external knowledge base" may denote a content pool which may be not local in the sense of this specification. The external knowledge base may be a scientific database, an expert system, a social knowledge platform, a social networking system, or the like, in particular accessible via the Internet and fed with information from a larger community of users. One example of such an external knowledge base may be "Quora"™ (www.quora.com) or "Wolfram Alpha"™ (www.wolframalpha.com). Numerous other knowledge bases may exist from which a user of the here proposed system and method may choose from. The selection may be made selectable via a user interface of the mind map enhancement system. The mind map enhancement system may search the Internet for additional and new external knowledge bases to be used in the context of the mind map enhancement method on a regular basis.

The proposed method for enhancing a first mind map may offer a couple of advantages:

Firstly, the mind map enhancement system and the related method may differentiate between the internal data sources and external data sources. Initially, starting from the core or first mind map, which may have been generated manually, the mind map enhancement system may allow organizing local or private data. These data may be available for a single user or a group of users collaborating in a local or private network. The system may detect additional objects within information items collected in a local content pool.

Additionally, a strength value of connections between different objects of the mind map may be assessed automatically. Thus, a relative strength between different objects on notes within the mind map may be classified based on electronically available information.

The method may work in such a way that it may be executed one or more times, in particular recursively. This way, an existing initial mind map may be extended and enhanced, step by step. In each step also a relative strength of connections between objects may be assessed automatically based on information items which may be available in a local content pool.

Furthermore, the method may allow finding the weakest link, i.e., the connection with the lowest strength value, within the mind map and confirm this specific connection or suggest that the connection may better not exist by using external information, in particular in form of a public knowledge base. Such a public knowledge base may be organized as a social network system. One example may be Quora (see above). Other similar systems may be scientific databases from universities, traditional social networking systems or, systems like Wolfram Alpha (see above), just to name a few.

Hence, the proposed method and system may enhance, extend, quantify and qualify objects and their relationships within a data structure organizing the objects relative to each other. A further advantage is that the resulting data structure may be rendered and recognized by a user as a mind map which may be edited. Additionally, a user interface may allow interacting with the system in each step of the extension and fortification.

According to one embodiment of the method, the second mind map may replace the first mind map and the method may be repeated in a next cycle. Thereby, the mind map may be extended again, in particular by another object and/or another connection between objects. This way, the starting mind map may be enhanced and extended step by step. A user interface may allow correction in the automatically generated new objects and connections after every step.

According to a further embodiment, the content may be based on one out of the group comprising content of a browser history, document in a document folder, an e-mail database, and a chat history. The content may also be stored in a private or personal cloud storage. In the context of this application, also information items like documents or multimedia files may also be treated as local information as long as they are owned by an individual user. This may apply even if the information items may not be stored on a local hard drive of a personal computer or other mobile personal device—like, e.g., a tablet computer or smartphone. Starting with a basic mind map which may have been generated using a user interface of the mind map enhancement system, the basic mind map may be extended automatically by digging through a vast amount of private data. The underlying data structure of the basic mind map may also be importable by the mind map enhancement system.

According to an enhanced embodiment of the method, a connection may be marked obsolete if the value strength of the connection is below a predefined strength threshold value. This way, also already existing connections between objects of the extended mind map may be deleted again or marked obsolete automatically. Such a determination for the deletion may be based on one of the semantic scans of different data sources.

A further enhanced embodiment of the method may comprise generating a signal triggering a rendering for a visual representation of the objects and the connections between the objects of the first and/or the second mind map, in particular the complete mind map. This may be used to manually evaluate the result of every automatic enhancement and quantification step by the mind map enhancement system. Using the user interface, corrections may be made by a user after each cycle of the extension of the mind map.

According to an additional enhanced embodiment of the method, the strength value may trigger a strength signal to influence a graphical unit to render the displayed connection according to the strength value. This may be an easy way to make the strength value between the different objects of the mind map visually recognizable. A higher strength value may generate a thicker line between objects than a lower strength value.

In one embodiment of the method, a user interface may be provided which may be adapted to redefine the strength value of a connection between two objects in the visual representation of the first and/or second mind map. It may be noted that a strength value equal zero may define that no connection is to be rendered between different objects. Alternatively if the strength value may be below a threshold, also this may be used as a basis for deciding that the related connection may be made obsolete and/or deleted. The user interface may also be adapted for allowing new objects and connections to add.

According to a further enhanced embodiment of the method, the new connection may be specified. Such a specified relationship between different objects of the mind map may be an output of the mind map scan using the mind map unit. This way, a connection may not only have a strength value but also a semantic meaning. Examples of such semantic meanings may include: "owned by", "part of", "later as", "depends on", "as an interesting side aspect of", "has the color", etc. The breadth of these couple of examples may illustrate the broad range a specified relationship may take. It basically describes not only that there may be a connection or relationship between two connected objects, but it also specifies the kind of relationship.

According to an again further enhanced embodiment of the method, the determining a strength value may also comprise using the specification of the connection as input for the determination of the strength value. This way, not only the object itself but also the already determined specified relationship between two connected objects may be used for a further enhancement of the mind map. This may lead to more realistic dependencies between related or connected objects.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for enhancing a first mind map is given. Afterwards, further embodiments of the mind map method and the mind map enhancement system will be described.

FIG. 1 shows a block diagram of an embodiment of the method 100 for enhancing—in particular, extending and qualifying—a first mind map, wherein the first mind map may comprise objects and connections between the objects. The method 100 may comprise providing, 102, a data source comprising a local content pool comprising information items. The local content pool may comprise all or selected documents available on a local computer system. This may include text documents, browser histories, search machine histories, check history, e-mails, but also information items comprising multimedia content like images, video data and, sound files as long as meaning for a semantic content may be derived from it. The information items may also be organized in a local content management system. Thus, all available information items of a user or a group of users of a local computer system or server may be used as content pool.

However, the concept of locally available information items may have to be expanded to those information items that a user, or a collaborating group of users may store in a joint storage. Such storage may also be accessible via Internet technologies. Hence, the extended concept of local storage may also comprise private data in cloud storage systems. However, it should be made clear that those content information items stored in cloud storage may not be shared with a public group of other users. Examples of the above-mentioned cloud storage for private use may be, e.g., Google Drive™, Microsoft Skydrive™ or Box™.

Additionally, the method may comprise performing, 104, a first semantic scan, in particular by a mind map agent, based on a selected object out of the objects using the content, in particular the information items, as input. The selection of the selected object may be based on a predefined algorithm or stochastically. Based on this a new object may be generated, 106. Herein, the semantic scan may provide as output a related expression to the selected object. It may be clear, that the related expression may be a semantically related expression or term. The expression may then become the new object within the first mind map. It may also be defined under which conditions a new expression may be taken as an extension to the mind map. The extension may be controlled by a threshold number of semantic links detected in the local content pool.

Moreover, a new connection between the selected object and the new object may be generated, 108, and may be stored in a related data structure describing the first mind map.

Additionally, a strength value for each of the connections of the first mind map may be generated, 110. This may be based on the number of semantic links determined between each pair of connected objects of the first mind map by performing, 112, a second semantic scan against each information item of the local content pool using each pair of connected objects as input. Thus, a baseline strength value of the connections of the mind map may be generated. The strength value must increase with the number of semantic links in a connection. The formula may be:

$$\text{strength value} = (OK\_Ref - KO\_Ref)/Ref, \text{ wherein}$$

OK_Ref=number of positive semantic links,
KO_Ref=number of negative semantic links,
Ref=total number information items,
as already explained above.

As a next step, the connection with the lowest strength value in the first mind map may be determined, 114. Hence, this determination may be based on the baseline strength value, as calculated above.

Next, for the object pair and the related connection having the lowest strength value within the first mind map, a third semantic scan may be performed using information items of an external knowledge base for a recalculation, 116, of the strength value of the connection. Depending of this new value, the connection can be suppressed when building the second mind map enhancing the first mind map. Thus, a determination of the strength value of the connection may be opened to outside influences. The external knowledge base may be any shared information source publicly available. This may be a scientific database, and knowledge sharing platform, a social networking system, and the like. It may be insured that more users then only the originator of the first mind map may have contributed to the content of the external knowledge base.

Taken by individual steps of the method together, the first mind map may be enhanced, in particular extended by a new object and the connections may be qualified by the value strength. Thus, the second mind map may be generated. In additional iterative steps, the initial mind map may be enhanced step-by-step an object by object with every cycle taken. In between and as part of the individual cycles, a user may influence the method steps using a user interface to refine objects, their meanings as well as connections and defined relationships between individual objects.

Figure 2:
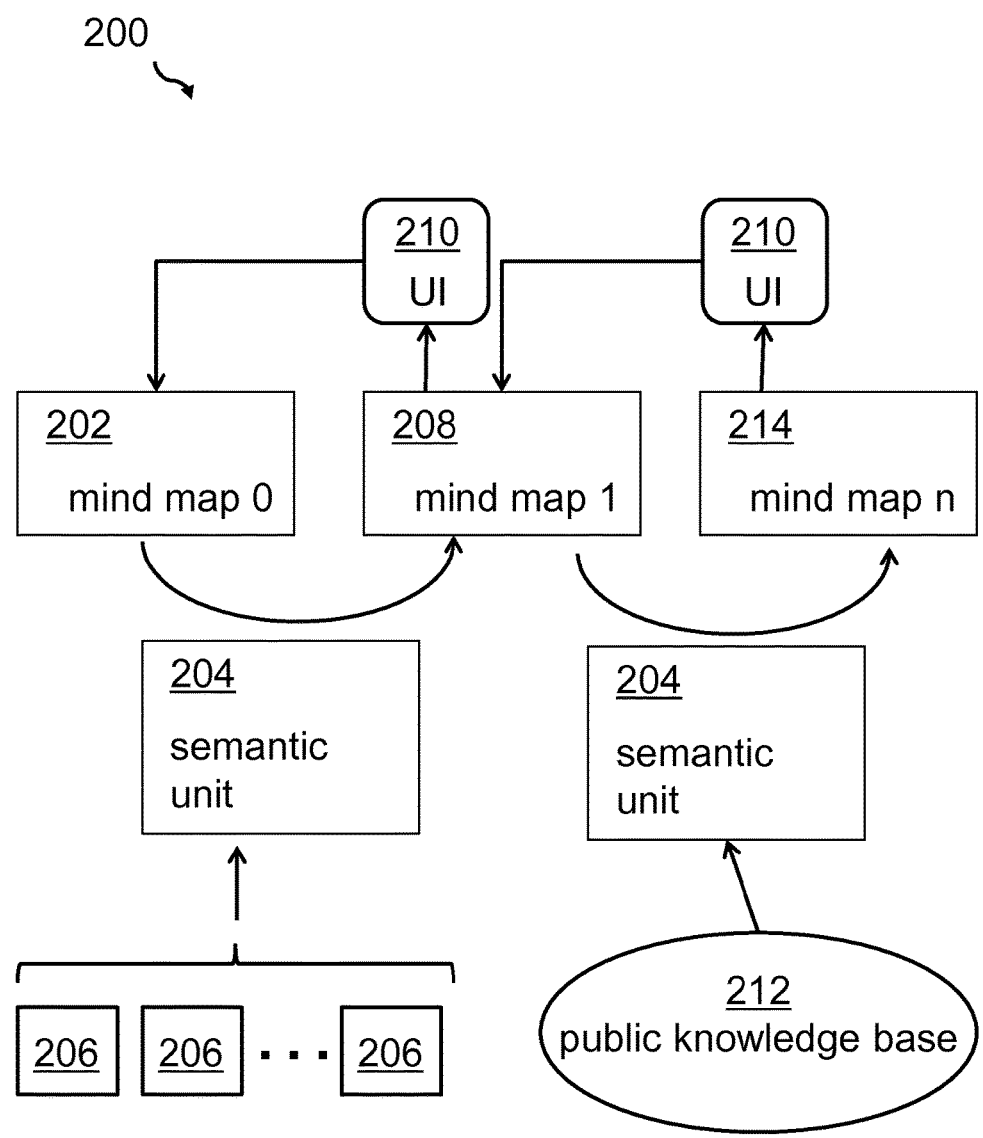
FIG. 2 shows a block diagram of the way and the use of information item sources to enhance a mind map.

FIG. 2 shows a block diagram 200 of the way and the use of information sources to enhance a mind map. The method 100 may start with mind map 0, 202. This may be hand-crafted by a user using the user interface of a computer 500. The initial data structure for the initial or first mind map 202 may comprise a single expression as the initial object or two objects with a defined connection in-between. In a first step using the semantic unit 204, the first mind map 202 may be extended by another object and a related connection to an already existing object. As input, the semantic unit 204 may use locally available information items 206 of a user. The different kind of locally available information items 206 have already been discussed above. This way, a mind map 1, 208 may be generated. Using a user interface 210, a user may adjust individual settings of the mind map 202 in respect to every object and every connection of the first mind map. Also new objects and new connections may be definable. Thus, a user may influence the process of extending the original mind map 202 in every way. However, there is no need for influencing the redefinition of the mind map. The process may run completely automatically.

The semantic unit 204 may also calculate or determine—on a second mode of operation—a value strength of all connections between connected objects of the mind map. As discussed above, this process may result in baseline strength values for the connections. Until here, the whole process may be based on locally available information in the sense of the above-defined locality.

In order to further evaluate and enhance the mind map, the semantic unit 204 may act again as an assessment instrument. For this purpose, the object pair of the mind map having the connection with the lowest strength value may be taken as input and may be tested against an external knowledge base 212. The sources of the external knowledge base 212 have already been discussed above. If, e.g., a central object of an initial mind map 202, 300 may be "new car" 302 and one of the connected objects may be "hybrid engine" 322, all individual information items of the external knowledge base 212 may be queried for a semantic connection, link or relationship between the just mentioned expressions of the objects—compare FIG. 3.

The initial strength value between "new car" 302 and "hybrid engine" 322 may be calculated as a relatively strong value because the content pool of the user having setup the initial mind map 202, 300 may comprise a lot of information about cars and hybrid engines. This may be because the user may especially be interested in this topic.

However, if another semantic scan may be made against a public knowledge base 212, the then calculated or determined value strength may be much lower because of a lower percentage of information items of the public knowledge base 212 may relate to cars and hybrid engines. Thus, the new value strength may be lower if compared with the baseline value strength of the related connection.

Again, the user may alter the final mind map n 214 after a plurality of enhancement cycles using the user interface 210. The user interface 210 may be the same, or a different one if compared to the user interface 210 between mind map 0, 202, and mind map 1 208. The user interface 210 may be adapted to change, in particular update, or delete, or redefine new connections between objects. Additionally, new objects may be defined for the mind map in any stage of its development.

Figure 3:
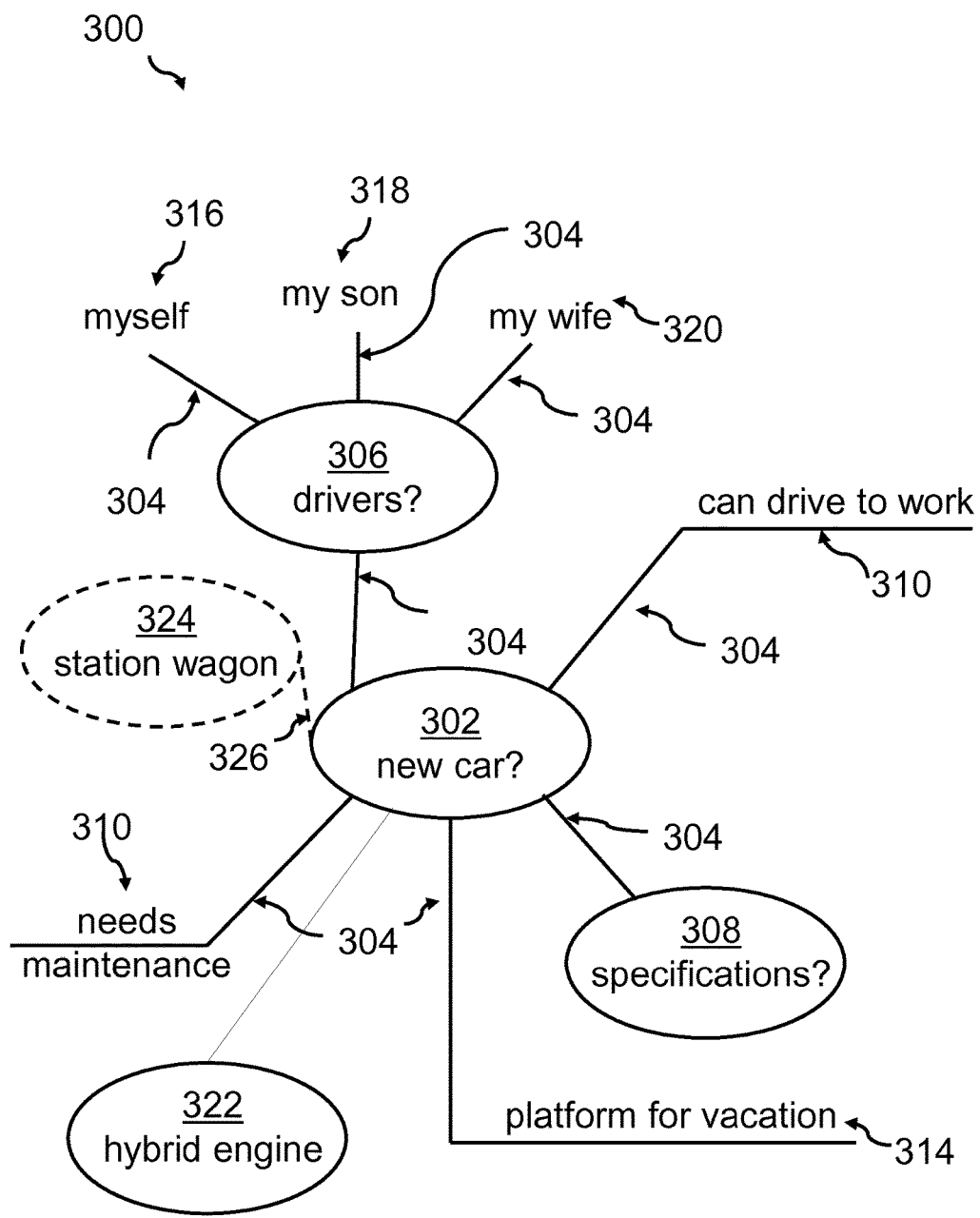
FIG. 3 shows an exemplary mind map.

FIG. 3 shows an example of a simple mind map 300. Here, the central expression may be "new car" 302. This central object may be connected via connections 304 to other objects of the mind map 300. Here, connections 304 exists to the other objects "driver" 306, "specifications" 308, "can drive to work" 310, "needs maintenance" 310, and "platform for vacation" 314. Starting from "drivers" 306, connections exist to the objects "myself" 316, "my son" 318 and "my wife" 320. A new object 324 may, e.g., be generated and connected to the initial object 302. Such an object may be, e.g., "station wagon" 324 because the local information items 206 may be full of semantic content relating a car to a station wagon. If the object "car" 302 may be the selected object, the term station wagon may represent the term having the highest score among all potential semantically linked expression to "new car" 302.

Figure 4:
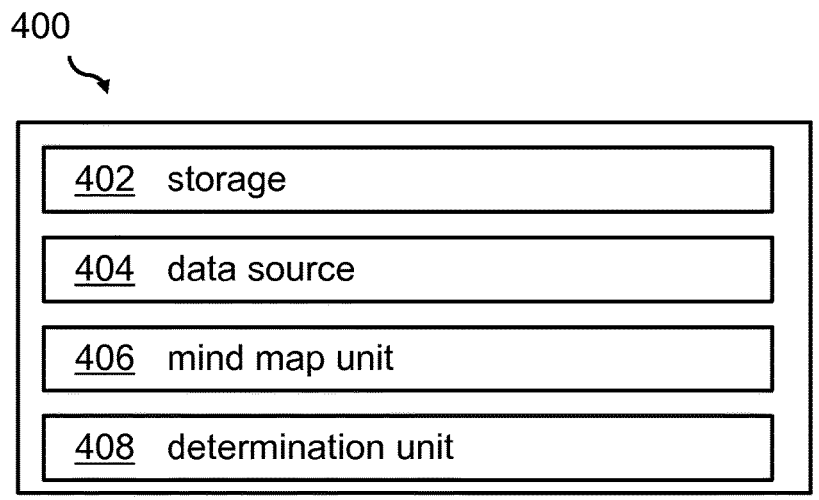
FIG. 4 shows a block diagram of an embodiment of the inventive mind map enhancement system.

FIG. 4 shows a block diagram of an embodiment 400 of the inventive mind map enhancement system 400. It may comprise storage 402 adapted for storing objects and connections between the objects of the first mind map 202, a data source storage 404 adapted for storing a local content pool comprising information items 206. It may be noted that the storage 402 and the data source storage 404 may technically be the same storage device.

Additionally, the mind map enhancement system may comprise a mind map unit 406 which may be adapted for performing a first semantic scan based on a selected object out of the objects using the content as input. It may also be adapted for generating a new object 324 based on the semantic scan and store as output in the storage a related expression to the selected object, whereby the expression becomes the new object within the first mind map 202. The mind map enhancement may also be adapted for generating a new connection between the selected object—here, 302—and the new object 324. Furthermore, the mind map enhancement system 400 may be adapted for performing a second semantic scan against each information item of the local content pool using each pair of connected objects as input to determine a strength value for each of the connections of the first mind map based on the number of semantic links determined between each pair of connected objects of the first mind map. The way, a baseline strength value of the connection may be calculated or determined has been already discussed above.

Furthermore, the mind map enhancement system 400 may comprise a determination unit 408 adapted for determining the connection with the lowest baseline strength value in the first mind map 208. The objects of the object pair having the lowest value strength value within the first mind map 208 may then be used as input for the mind map unit 406, for performing a third semantic scan. As reference, information items of an external knowledge base 212 for a recalculation of the lowest strength value computing a new strength value of the object pair may then be used. Examples of external knowledge bases have already been mentioned above.

Thus, the first mind map 202 may be enhanced to become a second mind map 214 which may be stored as a related data structure in a storage of a computer system 500.

Figure 5:
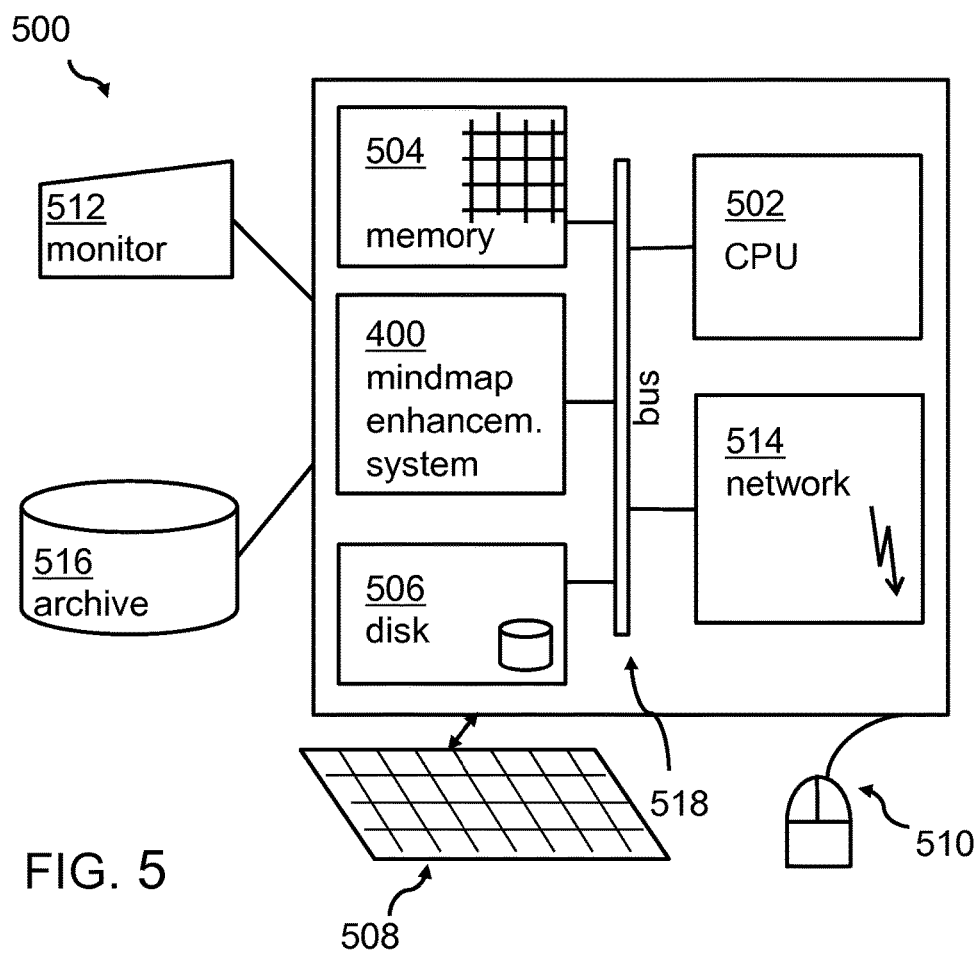
FIG. 5 shows an embodiment of a computer system comprising the mind map enhancement system.

Embodiments of the invention may be implemented together with virtually any type of computer, regardless of the platform being suitable for storing and/or executing program code. For example, as shown in FIG. 5, a computing system 500 may include one or more processor(s) 502 with one or more cores per processor, associated memory elements 504, an internal storage device 506 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 504 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 516 for an execution. Elements inside the computer XXX may be linked together by means of a bus system 518 with corresponding adapters. Additionally, the mind map enhancement system was a corresponding mind map unit may also be attached to the bus system 518. It may also be noted that the computer system 500 and the mind map enhancement system 400 may share the same storage—compare, e.g., reference numerals 402 and 506.

The computing system 500 may also include input means, such as a keyboard 508, a pointing device such as a mouse 510, or a microphone (not shown). Alternatively, the computing system may be equipped with a touch sensitive screen as main input device. Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing a first mind map to organize and visually outline information, wherein the first mind map comprises objects and connections between the objects, each of said connections connecting a pair of the objects, said first mind map being developed by a user and comprising an initial expression defining a first of the objects semantically linked by one of the connections to another of the objects, the method comprising:

providing a data storage comprising a local content pool comprising information items;

performing a first semantic scan, by a semantic unit of a computer processor system, based on the first object of the objects of the first mind map and using the information items of the local content pool as input for the first semantic scan;

generating, by the semantic unit of the computer processor system, an output comprising a new object for the first mind map from the local content pool to add an information item to the first mind map related to the first object, wherein the first semantic scan provides as output a semantic link between the selected object and the new object;

generating, by the semantic unit of the computer processor system, a new connection between the selected object and the new object;

determining, by the semantic unit of the computer processor system, a strength value for each of the connections of the first mind map based on a number of semantic links determined between each pair of connected objects of the first mind map by performing a second semantic scan against each information item of the local content pool using each pair of connected objects as input for the second semantic scan, wherein the strength value for each connection increases with an increasing number of semantic links determined between the pair of objects connected by said each connection;

determining, by a determination unit of the computer processor system, the one of the connections with the lowest strength value in the first mind map;

performing a third semantic scan, by the semantic unit of the computer processor system, using the one pair of the objects connected by the connection with the lowest strength value within the first mind map as input for the third semantic scan, and using information items of an external knowledge base for a recalculation of a new strength value for the one pair of objects;

determining, by the determination unit of the computer processor system, whether the connection with the lowest strength value within the first mind map is obsolete by comparing the recalculated new strength value with a baseline strength value; and enhancing, by a map enhancement system of the computer processor system, the first mind map by building a second mind map comprising only the connections of the first mind map which are not obsolete and the objects of the first mind map connected by the not obsolete connections to suppress obsolete connections from the second mind map.

2. The method according to claim 1, wherein the strength value is determined by:

strength value=$(OK\_Ref-KO\_Ref)/Ref$, wherein

OK_Ref=number of positive semantic links,
KO_Ref=number of negative semantic links,
Ref=total number information items used during the semantic scan.

3. The method according to claim 1, wherein the second mind map replaces the first mind map, and wherein the method is repeated in a next cycle thereby enhancing the mind map again.

4. The method according to claim 1, wherein the content is based on one out of a group comprising one or more of the following: a browser history; documents in a document folder; documents in a cloud repository; an e-mail database; a chat history; and acontent management system.

5. The method according to claim 1, wherein the step of determining whether the given connection with the lowest strength value is obsolete comprises: determining whether the new strength value of the given connection is below a predefined strength threshold value.

6. The method according to claim 1, further comprising: the computer processor system generating a signal triggering a rendering of a visual representation on a graphical unit of the computer processor system of the objects and the connections between the objects of the first and/or the second mind map.

7. The method according to claim 6, wherein the computer processor system uses one of the strength values to trigger a strength signal to influence the graphical unit to render a displayed connection according to the one strength value.

8. The method according to claim 1, further comprising: using a user interface for a user interacting with the compute processor system to redefine the strength value of a connection between two objects of the visual representation of the first and/or second mind map.

9. The method according to claim 1, further comprising: specifying the new connection.

10. The method according to claim 9, wherein the determining the strength value for each of the connections of the first mind map further comprises: using a specification ofeach of the connections as input for the determination of the strength value for each of the connections.

11. The method according to claim 1, wherein:
the first and second mind maps are first and second data structures; and
the method further comprises:
the computer processor system organizing the objects of the first and second mind maps within the first and second data structures, and rendering the first and second data structures on a graphical unit of the compute processor system; and
a user using a user interface of the computer processor system for interacting with the rendering of the first and second data structures.

12. A computer system for enhancing a first mind map to organize and visually outline information, wherein the first mind map comprises objects and connections between the objects, each of said connections connecting a pair of the objects, said first mind map being developed by a user and comprising an initial expression defining a first of the objects semantically linked by one of the connections to another of the objects, the computer system comprising:
a processor; and a computer readable storage medium having program instructions embodied therewith, wherein the computer readable storage medium is not a transitory signal per se, the program instructions executable by the processor to cause the processor to:

access a data storage comprising a local content pool comprising information items;

perform a first semantic scan, by a semantic unit of the computer system, based on the first object of the objects of the first mind map and using the information items of the local content pool as input for the first semantic scan;

generate, by the semantic unit of a computer processor system, an output comprising a new object for the first mind map from the local content pool to add an information item to the first mind map related to the first object, wherein the first semantic scan provides as output a semantic link between the selected object and the new object;

generate, by the semantic unit of the computer system, a new connection between the selected object and the new object;

determine, by the semantic unit of the computer system, a strength value for each of the connections of the first mind map based on a number of semantic links determined between each pair of connected objects of the first mind map by performing a second semantic scan against each information item of the local content pool using each pair of connected objects as input for the second semantic scan, wherein the strength value for each connection increases with an increasing number of semantic links determined between the pair of objects connected by said each connection;

determine, by a determination unit of the computer system, the one of the connections with the lowest strength value in the first mind map;

perform a third semantic scan, by the semantic unit of the computer system, use the one pair of objects connected by the connection with the lowest strength value within the first mind map as input for the third semantic scan, and using information items of an external knowledge base for a recalculation of a new strength value for the one pair of objects;

determine, by the determination unit of the computer system, whether the connection with the lowest strength value within the first mind map is obsolete by comparing the recalculated new strength value with a baseline strength value; and enhance, by a map enhancement system of the computer system, the first mind map by building a second mind map comprising only the connections of the first mind map which are not obsolete and the objects of the first mind map connected by the not obsolete connections to suppress obsolete connections from the second mind map.

13. The system of claim 12, wherein the strength value is determined by:

strength value=$(OK\_Ref-KO\_Ref)/Ref$, wherein

OK_Ref=number of positive semantic links,
KO_Ref=number of negative semantic links,
Ref=total number information items used during the semantic scan.

14. The system of claim 12, wherein the second mind map replaces the first mind map, and wherein the method is repeated in a next cycle thereby enhancing the mind map again.

15. The system of claim 12, wherein the step of determining whether the given connection with the lowest strength value is obsolete comprises: determining whether the new strength value of the given connection is below a predefined strength threshold value.

16. The system of claim 12, wherein the processor is further caused to: generate a signal triggering a rendering of a visual representation of the objects and the connections between the objects of the first and/or the second mind map.

17. A computer program product for enhancing a mind map to organize and visually outline information, wherein the first mind map comprises objects and connections between the objects, each of said connections connecting a pair of the objects, said first mind map being developed by a user and comprising an initial expression defining a first of the objects semantically linked by one of the connections to another of the objects, the computer program product comprising a computer readable storage medium having program instructions embodied therewith, wherein the computer readable storage medium is not a transitory signal per se, the program instructions executable by a processor to cause the processor to:

access a data storage comprising a local content pool comprising information items;

perform a first semantic scan, by a semantic unit of a computer processor system, based on the first object of the objects of the first mind map and using the information items of the local content pool as input for the first semantic scan;

generate, by the semantic unit of the computer processor system, an output comprising a new object for the first mind map from the local content pool to add an information item to the first mind map related to the first object, wherein the first semantic scan provides as output a semantic link between the selected object and the new object;

generate, by the semantic unit of the computer processor system, a new connection between the selected object and the new object;

determine, by the semantic unit of the computer processor system, a strength value for each of the connections of the first mind map based on a number of semantic links determined between each pair of connected objects of the first mind map by performing a second semantic scan against each information item of the local content pool using each pair of connected objects as input for the second semantic scan, wherein the strength value for the second semantic scan increases with an increasing number of semantic links determined between the pair of objects connected by said each connection;

determine, by a determination unit of the computer processor system, the one of the connections with the lowest strength value in the first mind map;

perform a third semantic scan, by the semantic unit of the computer processor system, use the one pair of objects connected by the connection with the lowest strength value within the first mind map as input for the third semantic scan, and using information items of an external knowledge base for a recalculation of a new strength value for the one pair of objects;

determine, by the determination unit of the computer processor system, whether the connection with the lowest strength value within the first mind map is obsolete by comparing the recalculated new strength value with a baseline strength value; and enhance, by a map enhancement system of the computer processor system, the first mind map by building a second mind map comprising only the connections of the first mind map which are not obsolete and the objects of the first mind map connected by the not obsolete connections to suppress obsolete connections from the second mind map.

18. The compute program product of claim 17, wherein the strength value is determined by:

strength value=$(OK\_Ref-KO\_Ref)/Ref$, wherein

OK_Ref=number of positive semantic links,
KO_Ref=number of negative semantic links,
Ref=total number information items used during the semantic scan.

19. The computer program product of claim 18, wherein the second mind map replaces the first mind map, and wherein the method is repeated in a next cycle thereby enhancing the mind map again.

20. The computer program product of claim 18, wherein the processor is further caused to: generate a signal triggering a rendering of a visual representation of the objects and the connections between the objects of the first and/or the second mind map.

\* \* \* \* \*